United States Patent
Ziaee et al.

(10) Patent No.: US 10,963,369 B2
(45) Date of Patent: Mar. 30, 2021

(54) SOFTWARE AS A SERVICE PLATFORM UTILIZING NOVEL MEANS AND METHODS FOR ANALYSIS, IMPROVEMENT, GENERATION, AND DELIVERY OF INTERACTIVE UI/UX USING ADAPTIVE TESTING, ADAPTIVE TESTER SELECTION, AND PERSISTENT TESTER POOLS WITH VERIFIED DEMOGRAPHIC DATA AND ONGOING BEHAVIORAL DATA COLLECTION

(71) Applicant: APPTOURAGE INC., Oakland, CA (US)

(72) Inventors: Ashkan Ziaee, Oakland, CA (US); Felix Skyler Hamilton, Ferndale, CA (US)

(73) Assignee: Ashkan Ziaee, Oakland, CA (US)

( * ) Notice: Subject to any disclaimer, the term of this patent is extended or adjusted under 35 U.S.C. 154(b) by 0 days.

(21) Appl. No.: 15/956,677

(22) Filed: Apr. 18, 2018

(65) Prior Publication Data
US 2019/0324896 A1 Oct. 24, 2019

(51) Int. Cl.
*G06F 11/36* (2006.01)
*G06F 9/451* (2018.01)
(Continued)

(52) U.S. Cl.
CPC ........ *G06F 11/3684* (2013.01); *G06F 3/0481* (2013.01); *G06F 11/3664* (2013.01); *G06F 11/3692* (2013.01); *G06N 20/00* (2019.01); *H04L 67/22* (2013.01); *G06F 9/451* (2018.02); *G06F 9/547* (2013.01)

(58) Field of Classification Search
None
See application file for complete search history.

(56) References Cited

U.S. PATENT DOCUMENTS

| | | | | |
|---|---|---|---|---|
| 7,039,912 B1 * | 5/2006 | Moulden, Jr. | ....... | G06F 11/3664 |
| | | | | 714/E11.207 |
| 8,589,740 B2 * | 11/2013 | Nagata | ..... | G06F 11/07 |
| | | | | 714/46 |

(Continued)

*Primary Examiner* — Kenny S Lin

(57) ABSTRACT

A software as a service platform employing novel means and methods to do demographic and behavioral data collection on and analysis of human UI/UX interactions. By utilizing adaptive testing, adaptive tester selection, and persistent tester pools with verified demographic data and ongoing behavioral data collection via a wide range of manual and algorithmic methods, decomposing, recomposing, and delivering optimized UI or UX data sources, collecting, integrating, delivering, and analyzing demographic and behavioral data regarding human interaction with interactive user interfaces and experiences using manual, hybrid, or algorithmic methods such as machine learning algorithms or path-finding algorithms, the present invention provides a novel framework for the extraction of comprehensive, consistent, and dynamic insights into the demographic and behavioral interactions of humans with interactive digital media sources. These insights can be used to dynamically and adaptively improve human experiences with interactive digital media.

16 Claims, 4 Drawing Sheets

(51) Int. Cl.
    *G06F 3/0481*    (2013.01)
    *H04L 29/08*    (2006.01)
    *G06N 20/00*    (2019.01)
    *G06F 9/54*    (2006.01)

(56) References Cited

U.S. PATENT DOCUMENTS

| | | | |
|---|---|---|---|
| 8,850,393 B2* | 9/2014 | Castro | G06F 11/3688 714/38.1 |
| 9,451,303 B2* | 9/2016 | Kothuri | A61B 5/16 |
| 9,727,448 B1* | 8/2017 | Seibert, Jr. | G06F 11/368 |
| 10,459,828 B2* | 10/2019 | Seibert, Jr. | G06F 11/368 |
| 10,664,721 B1* | 5/2020 | Price | G06F 3/04847 |
| 2002/0169652 A1* | 11/2002 | Busche | G06Q 30/02 706/21 |
| 2009/0030762 A1* | 1/2009 | Lee | G06Q 10/06311 705/7.17 |
| 2015/0347970 A1* | 12/2015 | Kirtane | G06Q 10/101 717/103 |
| 2018/0074944 A1* | 3/2018 | Hirt | G06F 3/04817 |
| 2018/0279934 A1* | 10/2018 | Wo | A61B 3/02 |
| 2019/0042071 A1* | 2/2019 | Gandhi | H04L 67/22 |
| 2019/0163450 A1* | 5/2019 | Petrillo | G06F 8/35 |
| 2019/0213116 A1* | 7/2019 | Kulkarni | G06F 11/3664 |

\* cited by examiner

SOFTWARE AS A SERVICE PLATFORM UTILIZING NOVEL MEANS AND METHODS FOR ANALYSIS, IMPROVEMENT, GENERATION, AND DELIVERY OF INTERACTIVE UI/UX USING ADAPTIVE TESTING, ADAPTIVE TESTER SELECTION, AND PERSISTENT TESTER POOLS WITH VERIFIED DEMOGRAPHIC DATA AND ONGOING BEHAVIORAL DATA COLLECTION

CROSS-REFERENCE TO RELATED APPLICATIONS

Applicant hereby claims priority under 35 USC § 119 to provisional U.S. patent application Ser. No. 62/487,309, filed Apr. 19, 2017, entitled "Software as a service platform utilizing novel means and methods for analysis, improvement, generation, and delivery of interactive UI/UX using adaptive testing, adaptive tester selection, and persistent tester pools with verified demographic data and ongoing behavioral data collection". The entire contents of the aforementioned application are herein expressly incorporated by reference.

BACKGROUND OF THE INVENTION

The present invention is in the technical field of computer software. More particularly, the present invention is in the technical field of computer software as a service. More particularly, the present invention is in the technical field of computer software as a service for the purpose of interactive UI/UX or algorithmic learning system analysis and improvement using adaptive testing, adaptive tester selection, and persistent tester pools with verified demographic data and ongoing behavioral and psychographic data collection.

Traditional approaches to interactive user interface (UI) and user experience (UX) testing, analysis, and delivery have many significant drawbacks. Testing and analysis does not generally take place during the UI/UX development process, nor is it generally an integral part of the industry standard design, develop, deploy build cycle. When UI/UX testing does occur, tester pools are not optimized: either they are not persistent in which case tester behavior can only be analyzed on a case by case basis, or dedicated tester pools are small in size and insufficiently diverse from a demographic and behavioral standpoint.

In addition, the use of non persistent tester pools provides limited data points for doing algorithmic analysis of behavioural variances amongst testers and pools of testers, inter-rater reliability, and tester psychographics ("inter tester analysis"). When A/B testing is utilized, it is frequently conducted on an ad hoc basis with live testers or users, this drastically increases the difficulty of creating and managing control groups and accurately validating tester data. More sophisticated multivariate testing is generally infeasible from a UI/UX perspective because the overhead associated with configuring statistically meaningful tests in conjunction with assembling demographically diverse tester pools of sufficient size is daunting. As a result, often when UI/UX testing is conducted, detailed information about tester demographics is not available or not verifiable or both.

Furthermore, not having sufficiently large demographically diverse tester pools readily available results in highly skewed tester selection and pervasive self selection bias. Without reliable inter tester analysis and demographic data available, the utility of adaptive tester selection algorithms during the UI/UX testing process is minimized. Perhaps as a consequence of some of the drawbacks associated with traditional UI/UX testing, many other powerful adaptive testing methodologies are also not generally utilized—specifically, adaptive algorithms are not used within individual tests nor are they used to modify tests on an iterative basis during the overall testing process. Without the availability of large and persistent tester pools, inter tester analysis, accurate and verifiable demographic tester data, traditional approaches to interactive UI/UX testing tend not to support most accurate advanced testing methodologies. Even when some adequate testing and analysis is utilized on an interactive user interface (UI) or user experience (UX), the results are rarely applied to the generation of an optimized UI or UX and its subsequent delivery to a user.

Moreover, despite rapid recent advances in state of the art 'expert systems', heuristic models, and other algorithmic learning systems, many challenges to the implementation of effective supervised or reinforced learning methods remain. Simply sourcing a large enough pool of experts (or testers) to provide consistent, high quality signals to utilize in supervised or reinforced learning can be logistically challenging. Even if a large enough pool of experts can be acquired, validating expert tester feedback continuously for a specified problem regime can be difficult without a persistent expert pool. If the expert pool is not persistent, maintaining the historical awareness required to meaningfully track, rank, and accurately weight feedback from various testers is virtually impossible. Without some capacity for dynamic experiment generation and delivery, effectively managing inputs and outputs for a reinforced or supervised algorithmic learning system is difficult at best.

BRIEF SUMMARY OF THE INVENTION

The present invention is a software as a service platform employing novel means and methods to improve an interactive UI/UX, heuristic data model, or algorithmic learning system by employing adaptive testing, adaptive tester selection, and persistent tester pools with verified demographic data and ongoing behavioral data collection. By utilizing large and persistent tester pools, inter tester analysis, accurate and verifiable demographic and behavioral tester data in conjunction with advanced adaptive testing methodologies, the present invention addresses some of the drawbacks associated with traditional UI/UX testing and supervised or reinforced training methods. The invention addresses the aforementioned difficulties by providing a novel framework for the testing, analysis, improvement, generation, delivery, and optimization of an interactive UI/UX or algorithmic learning systems.

DETAILED DESCRIPTION OF THE INVENTION

Figure 1:
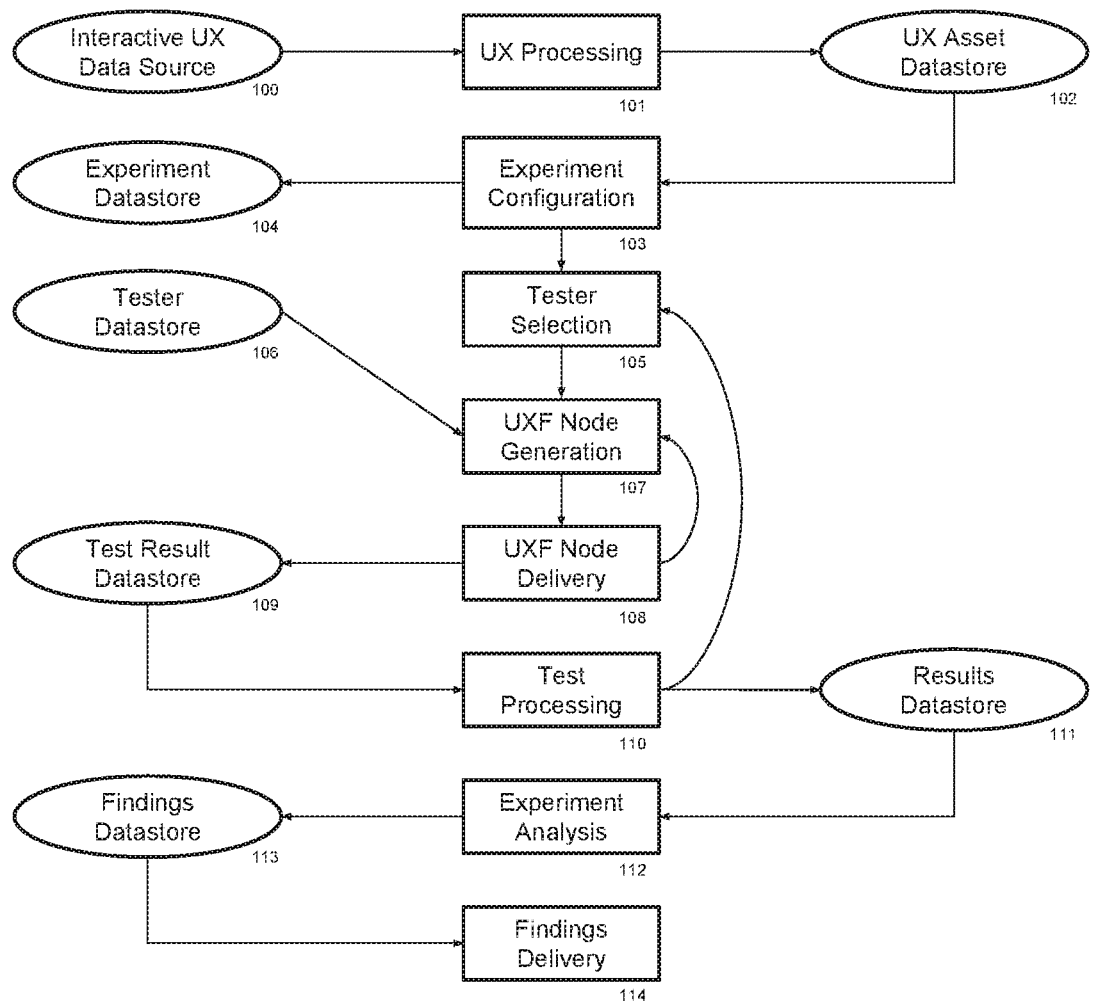
FIG. 1 provides an overview of the data flow model of the present invention.

Referring now to the invention in more detail, in FIG. 1 there is shown an overview of the data flow model of the present invention. A data source from an interactive UI/UX source 100 is accessed by the system and is addressed by the UX processing 101 component. The UX processing 101 component processes the data source from the UX source 100, first generating an algorithmic representation of an interactive user experience (finite state machine, structured graph, etc.) from the UX source 100 then decomposing that representation into a discrete set of assets (user experience frames 122 or UXFs), user experience elements 121 or UXEs, and user experience actions 123 or UXAs) that together characterize all possible states and transitions for a specific interactive user experience 125 or UX. The set of all possible interactive user experiences 125 for a specific experiment is known as an "experience universe" 124 or XU.

In more detail, still referring to the invention of FIG. 1, the set of assets generated by the UX processing 101 component are then stored in the UX asset datastore 102. The UX asset datastore 102 is then used by the experiment configuration 103 component via manual user interaction, algorithmic, or hybrid methods to configure an experiment which is then stored in the experiment datastore 104. User defined graph specific constraints assist in the algorithmic generation of UXF nodes in the UXF node generation 107 component and may include: UXF entry points, UXF node exit points, test termination criteria (i.e. session timeouts, tester failure conditions, etc), weighting on a per UXF basis, specified variance to reference graph or graphs, UXF node ordering constraints, and many others. User defined tester selection criteria assist in the operation of the tester selection 105 component and may include demographic data (i.e. age, gender, race, political party, skill sets, work history, etc), tester data (i.e. tester performance history, tester ratings, tester price, tester batch size, total number of testers desired, etc), and previous experimental data. Active experiments are queued, and when an experiment reaches the top of the experiment queue it enters the tester selection 105 component. The tester selection 105 component retrieves an initial set of 1-N testers from the tester datastore 106 based on user defined tester selection criteria including batch size and total number of testers as configured during experiment configuration 103, temporal data (data collected on current test, current experiment, current tester behavior, etc) and experiential data (historical, behavioral, and demographic data from all previous experiments and testers) generally stored in the tester datastore 106, the test result datastore 109, and the findings datastore 113. In more detail, still referring to the invention of FIG. 1, the adaptive tester selection 105 component may employ manual, hybrid, or algorithmic methods which may include but are not limited to machine learning algorithms (i.e. linear regression, logistic regression, cluster analysis, neural networks, etc.) or path-finding algorithms. For each tester in the current tester set selected during tester selection 105, an initial UXF node is adaptively generated by the UXF node generation 107 component based on the user defined graph specific constraints configured by the experiment configuration 103 component, temporal data, and experiential data. The UXF node generation 107 component may employ manual, algorithmic, or hybrid methods which may include but are not limited to machine learning algorithms (i.e. linear regression, logistic regression, cluster analysis, neural networks, etc.) or path-finding algorithms.

In more detail, still referring to the invention of FIG. 1, each UXF node generated is then delivered to the specified tester for completion by the UXF node delivery 108 component via a wide variety of potential methods. Test delivery methods may include an interactive web site, a mobile application, a virtual reality experience, a video, or any interactive user experience. After each UXF node is completed by the specified tester, results are returned to the UXF node generation 107 component and this iterative adaptive process is continued until an exit point is reached or termination criteria are met for each tester. Once UXF node delivery 108 results in exit or termination, test results for each tester are stored in the test result datastore 109. Once the test result datastore 109 has results for all testers in the current batch, batch test results are passed to the test processing 110 component. If the termination criteria for the experiment at large as set by the experiment configuration 103 component have not yet been met, the next batch of testers is adaptively selected by the tester selection 105 component. If termination criteria have been met, the test processing 110 component removes the current experiment from the active experiment queue in the experiment datastore 104 and stores the experiment results in the results datastore 111. At this point the experiment analysis 112 component processes the experiment results from the results datastore 111, algorithmically generating a wide range of metrics that assist in finding the best UX path and suggestions for experiment and UX improvements.

In more detail, still referring to the invention of FIG. 1, the results of analysis are stored in the findings datastore 113 and delivered to the user by the findings delivery 114 component. User interactions with the findings of a completed experiment include but are not limited to: deleting one or more testers test results, rating one or more testers performance on this experiment, requesting that the SaaS platform ask one or more testers to participate in an additional experiment, making one or more other offers or follow-up interactions to one or more testers via the SaaS platform. The results of a completed or partial experiment found in the results datastore 113 and the findings datastore 114, in conjunction with the experiment datastore 104 can be used in the automatic generation of a dynamic and adaptive interactive UX data source 100 in a production environment. Mechanisms utilized in this process may employ manual, algorithmic, or hybrid methods which may include but are not limited to machine learning algorithms (i.e. linear regression, logistic regression, cluster analysis, neural networks, etc.) or path-finding algorithms.

In more detail, still referring to the invention of FIG. 1, the functional system components (identified in FIG. 1 by rectangular borders), namely UX processing 101, experiment configuration 103, tester selection 105, UXF node generation 107, UXF node delivery 108, test processing 110, experiment analysis 112, and findings delivery 114, in a preferred embodiment of the present invention consist of independent software programs controlled by a single organization or individual running on dedicated compute devices and interacting with each other, their data sources, data stores, and any external users or applications via APIs over LAN, WAN, or wireless network connections.

In more detail, still referring to the invention of FIG. 1, in a preferred embodiment of the present invention, all input and output data elements and datastores (identified in FIG. 1 by ellipsoid borders) associated with each functional system component, namely each interactive UX data source 100, UX asset datastore 102, experiment datastore 104, tester datastore 106, test result datastore 109, results datastore 111, and findings datastore 113 are stored in independent data stores by type. All data stores are, in a preferred embodiment, controlled by a single organization or individual running on dedicated compute devices each controlling one or more storage devices which provide storage capacity sufficient to redundantly store all data elements associated with each independent data store and interacting with the functional system components, each other, and any external users or applications via APIs over LAN, WAN, or wireless network connections. In alternative embodiments, one, several, or all of the system functional components and data stores together comprising the present invention may be implemented as one or more software programs and data stores controlled by one or more organizations or individuals, and one, several, or all functional components and data stores may be implemented in such a way as to run on a single or several compute and storage devices.

Figure 2:
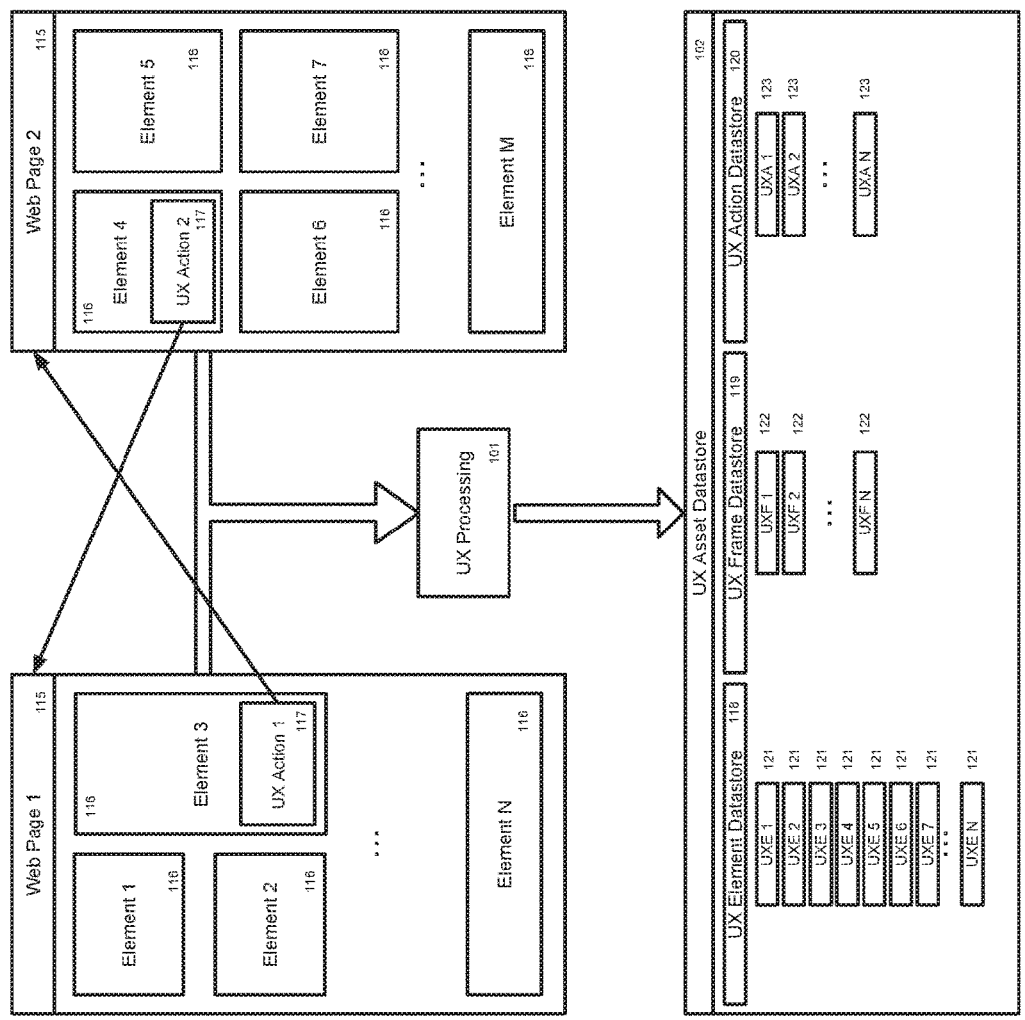
FIG. 2 shows the functionality of the user experience processing component of the present invention.
Figure 3:
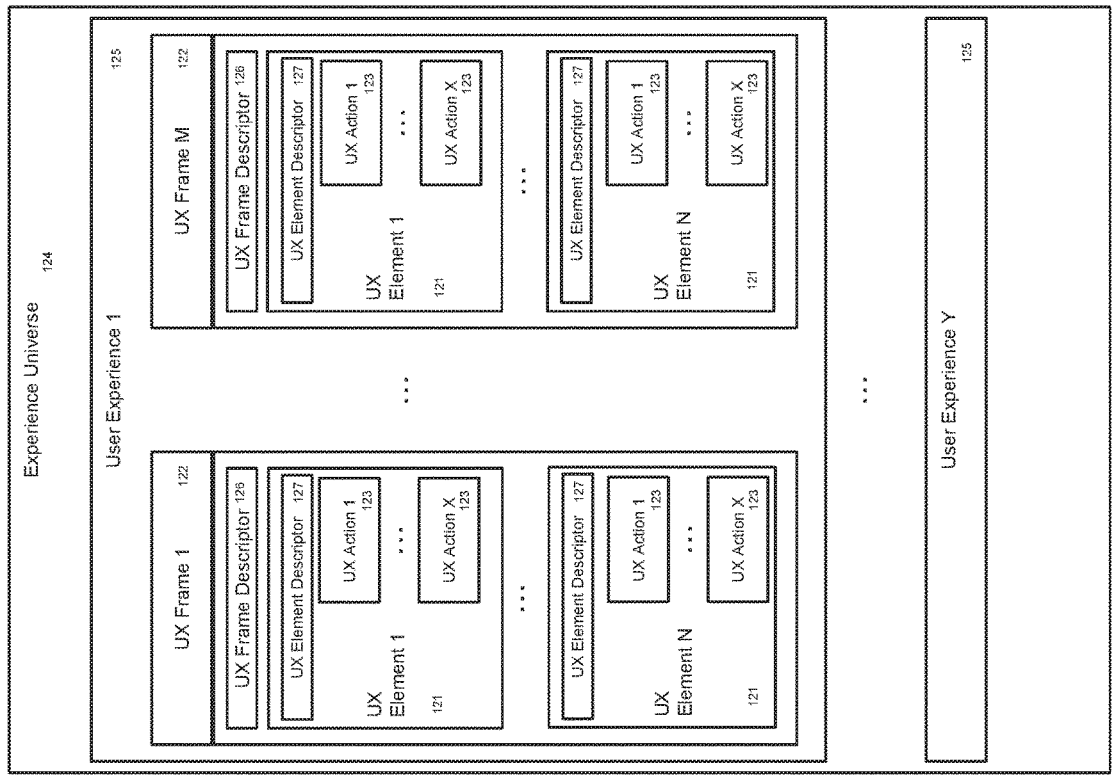
FIG. 3 details the adaptive data framework of the present invention.

Referring now to the invention in more detail, in FIG. 1 to FIG. 3, interactive UX data sources 100 within the scope of the preferred embodiment of the present invention include but are not limited to interactive digital media and user experiences in any and all forms (i.e. video games, applications, computer software, web content, surveys, polls, a series of videos or images, a virtual or augmented reality experience, advertising, etc). The invention applies equally to any interactive UX data source 100 that can be decomposed manually or programmatically into a series of discrete states, or using any decomposed series of discrete states from an interactive UX data source 100 to regenerate an adaptive, dynamic interactive user experience.

Referring now to the invention as shown in FIG. 2 to FIG. 3, the functionality of the UX processing 101 component of the system depicted in FIG. 1 is shown in greater detail. The specific interactive UX data source 100 used for the purposes of FIG. 2 is an interactive web page 115, but any other interactive UI or UX data source 100 can be processed in a functionally equivalent manner. In the first stage, the interactive UI or UX data source is decomposed manually or programmatically into a series of discrete states. In this case, two interactive web pages 115 actively linked by UX actions 117 are used to demonstrate the decomposition process. Frequently the automated UX processing 101 component makes use of finite state machines or structured graphs to decompose an interactive UX data source 100, but many other alternative manual or algorithmic methodologies are equally applicable within the scope of the present invention. Once an interactive UX data source 100 is decomposed into a series of discrete states, each state (for the purpose of this example represented by each web page 115) is further decomposed to generate a UX frame (UXF) 122 as well as a user experience frame descriptor (UXFD) 126 which describes the spatial temporal structure, constraints, and relationships for the subcomponents of each UXF 122. Each web page 115 is further deconstructed into compositional elements by the UX processing 101 component, generating one or more elements 116 which each may contain zero or more UX actions 117. Each element 116 is represented by a UX element (UXE) 121 and each UX action 117 is represented by a UXA 123. A UX element descriptor (UXED) 127 describing the spatial temporal dimensions and UXF 122 constraints required to contain a UXE 121 within a UXF 122 is generated for each element 116. For each UXA 123 an UX action descriptor (UXAD) is generated which links to another UXF 122 and represents a discrete state transition in the originating interactive UX data source 100. Once the UX processing 101 component finishes decomposition for each discrete state of the interactive UX data source 100, all generated components and subcomponents are stored in the UX asset datastore 102. UXFs 122 are stored in the UX frame datastore 119 with associated UXFDs 126, UXEs 121 are stored in the UX element datastore 118 with associated UXEDs 127, and UXAs 123 are stored in the UX action datastore 120 with associated UXADs.

In more detail, referring to the invention of FIG. 1 to FIG. 3, once the UX processing 101 component has completed storing the decomposed discrete states of the interactive UX data source 100 in the UX asset datastore 102, the assets stored in the UX asset datastore can be used by the experiment configuration 103 component and the UXF node generation 107 component to dynamically and adaptively generate UXF nodes which can then be delivered to a tester (selected by the tester selection 105 component from the tester datastore 106) by the UXF node delivery 108 component. The results of a single test are stored by the test processing 110 component as a UX 125 in the test result datastore 109, and the set of all UXs 125 associated with an individual experiment from the experiment datastore 104 are stored as a XU 124 in the results datastore 111. A XU 124 is analyzed by the experiment analysis 112 component and the resulting analysis is stored in the findings datastore 113. Finally, findings from the findings datastore 113 are delivered to the user by the findings delivery 114 component, generally leading to the configuration of new experiments in the experiment configuration 103 component either programmatically or or as a result of manual human interaction.

Figure 4:
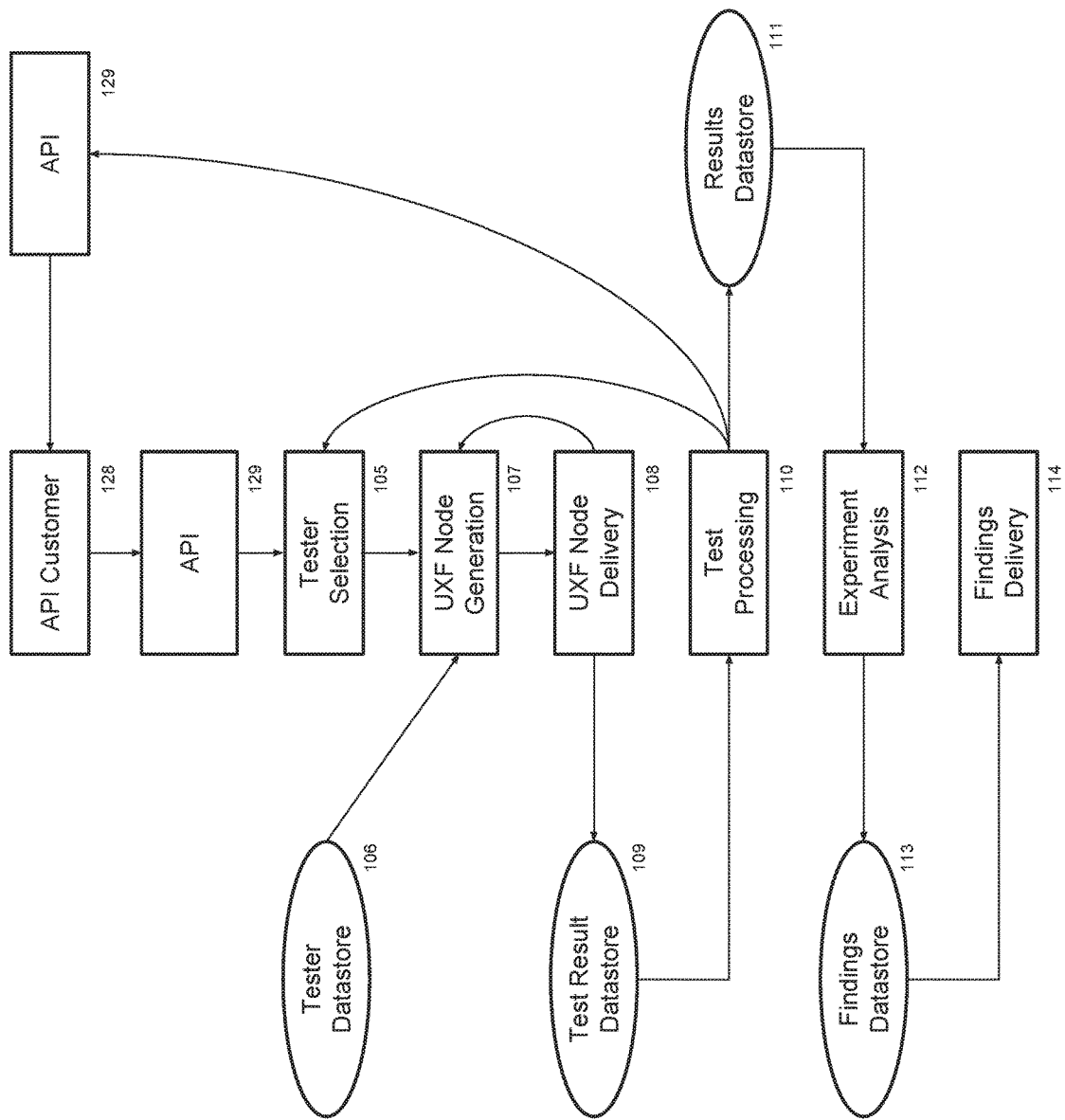
FIG. 4 shows an overview of how third party interaction can affect the ongoing operation of the present invention.

Referring now to the invention as presented in FIG. 4 with reference to FIG. 1, an alternative data flow model is shown depicting how the preferred embodiment of the present invention allows an API (application programming interface) customer 128 to interact with the system via an API 129. In this configuration, the functionality of the interactive UX data source 100, the UX processing 101 component, the UX asset datastore 102, the experiment configuration 103 component, and the experiment datastore 104 can be wholly or partially replaced by configuration information and data provided by an API customer 128 via the API 129. Exposing tester selection 105, UXF node generation 107, UXF node delivery 108, and test processing 110 components to API customers 128 via an API 129 allows one time, intermittent, or continuous control of all adaptive and dynamic functionality within this set of system components. Granular control of tester selection 105 and UXF node generation 107 allows API customers 128 to get on demand targeted human feedback regarding internal API customer 128 human, algorithmic, or hybrid processes. This capability is of particular interest in cases where the API customer 128 is utilizing supervised or reinforced heuristic learning algorithms and intermittent or continuous feedback can greatly improve training performance; for instance, feedback from human experts, algorithmic, or hybrid sources regarding outcomes reached.

Referring now to the invention as presented in FIG. 4 with reference to FIG. 1, the value of human, algorithmic, or hybrid feedback provided by the present invention via the operation of the dynamic and adaptive system components tester selection 105, UXF node generation 107, UXF node delivery 108, and test processing 100 to API customers 128 via an API 129 is significant not just for many machine learning applications, but for other human, algorithmic, and hybrid processes internal to an API customer 128. By allowing an API customer 128 to provide tester selection criteria via an API 129 which then is used to configure the operation of the tester selection 105 component—said tester selection criteria may include demographic data (i.e. age, gender, race, political party, skill sets, work history, etc), tester data (i.e. tester performance history, tester ratings, inter tester analysis, tester price, tester batch size, total number of testers desired, etc), and previous experimental data among many others—optimized feedback on desired internal processes for an API customer 128 can be acquired. Likewise, API customer 128 configuration of the algorithmic generation of UXF nodes in the UXF node generation 107 component via an API 129 by specifying variables including UXF entry points, UXF node exit points, test termination criteria (i.e. session timeouts, tester failure conditions, etc), weighting on a per UXF basis, predefined functions to walk a graph database, predefined UXF node sequences, specified variance to reference graph or graphs, UXF node ordering constraints, and many others, also enhances the quality of feedback acquired on internal API customer processes via interaction with the present invention via API 129.

The advantages of the present invention include, without limitation, the ability to process, deconstruct, reconstruct, and deliver interactive user interfaces and experiences for testing and end user consumption in production. Further, to collect, integrate, deliver, and analyze demographic and behavioral data regarding human interaction with interactive user interfaces and experiences using adaptive testing, adaptive tester selection, and persistent tester pools with verified demographic data and ongoing behavioral data collection via a wide range of manual and algorithmic methods, and, most importantly, to generally provide novel means and methods for the testing, analysis, improvement, optimization, and targeted delivery of a wide variety of interactive UI/UX data sources to the state of the art which are comparable or better to those means and methods currently existing which test, analyze, and deliver the human experience of interactive digital media.

In broad embodiment, the present invention is a software as a service platform which provides the capability to collect, integrate, deliver, and analyze demographic and behavioral data on UI/UX interactions via human, algorithmic, and hybrid methods in a consistent and adaptive manner and to use the range of generated data interactively for the testing, analysis, improvement, optimization, and targeted delivery of interactive digital media.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. An interactive User Interface generating method comprising:
   Extracting user interface elements and navigation pathways from at least one or more user interfaces, the user interface elements comprises at least one or more of input controls, navigational components, informational components, or containers, and the navigation pathways comprises at least one or more states and one or more transitional events that result in changes to one of the at least one or more user interfaces;
   Generating a finite set of user experiences from the extracted user interface elements and navigation pathways; wherein each of the user experiences comprises of one or more of user experience frame, one or more of user experience element and one or more of user experience action;
   Storing the finite set of user experiences in a data repository;
   Composing one or more customized user experiences by combining some of the extracted user interface elements and navigation pathways;
   Generating one or more user experience tests using the one or more customized user experiences;
   Selecting one or more ideal candidate testers from a tester database using one or more algorithm; where the tester database stores a plurality of tester feature information and tester interaction history;
   Presenting the one or more user experience tests to the selected one or more ideal candidate testers;
   Analyzing interactions of the selected one or more ideal candidate testers testing the one or more user experience tests presented;
   Generating, using the analyzed interactions, mapping data containing mapping of users to a subset of the one or more customized user experiences based on one or more of user categorization criteria and user information;
   Storing the mapping data in the data repository; and
   Generating at least one or more user-specific dynamic user interfaces using the mapping data for each user.

2. The method of claim 1, wherein the step of extracting user interface elements and navigation pathways is performed via at least one of human interaction, computer algorithm or a human supervised algorithm.

3. The method of claim 1, wherein the tester feature information includes one or more of demographic, psychographic, behavioral data or identification data about one or more testers.

4. The method of claim 1, wherein the step of analyzing interactions utilizes a machine learning algorithm selected from at least one of a support vector machine, cluster analysis, a decision tree, or a neural network.

5. The method of claim 1, further comprising: an application programming interface to enable third party entities to perform system management.

6. The method of claim 1, further comprising: replacing part or all of a live user interface with the one or more user experience tests and collecting live user interactions.

7. The method of claim 1, further comprising: parsing historical user interaction data from one or more of an application, a network, a device, or an operating system; and combining the historical user interaction data with the user experience tests to generate simulated test results.

8. The method of claim 1, wherein the step of composing one or more customized user experiences utilizes a methodology selected from one of human interaction, iterative testing algorithm, adaptive learning algorithm, or rule based methods.

9. An interactive User Interface generating system comprising:
   A computing device comprising a processor and a memory unit;
   A data repository in communication with the computing device;
   Wherein the memory unit stores program instructions, and when executed by the processor, causing the system to perform:
     Extract user interface elements and navigation pathways from at least one or more user interfaces, the user interface elements comprises at least one or more of input controls, navigational components, informational components, or containers, and the navigation pathways comprises at least one or more states and one or more transitional events that result in changes to one of the at least one or more user interfaces;

Generate a finite set of user experiences from the extracted user interface elements and navigation pathways; wherein each of the user experiences comprises of one or more of user experience frame, one or more of user experience element and one or more of user experience action;

Store the finite set of user experiences in the data repository;

Compose one or more customized user experiences by combining some of the extracted user interface elements and navigation pathways;

Generate one or more user experience tests using the one or more customized user experiences;

Select one or more ideal candidate testers from a tester database using one or more algorithm; where the tester database stores a plurality of tester feature information and tester interaction history;

Present the one or more user experience tests to the selected one or more ideal candidate testers;

Analyze interactions of the selected one or more ideal candidate testers testing the one or more user experience tests presented;

Generate, using the analyzed interactions, mapping data containing mapping of users to a subset of the one or more customized user experiences based on one or more of user categorization criteria and user information;

Store the mapping data in the database; and

Generate at least one or more user-specific dynamic user interfaces using the mapping data for each user.

10. The system of claim 9, wherein the step of extracting user interface elements and navigation pathways is performed via at least one of human interaction, computer algorithm or a human supervised algorithm.

11. The system of claim 9, wherein the tester feature information includes one or more of demographic, psychographic, behavioral data or identification data about one or more testers.

12. The system of claim 9, wherein the step of analyzing interactions utilizes a machine learning algorithm selected from at least one of a support vector machine, cluster analysis, a decision tree, or a neural network.

13. The system of claim 9, further comprising: an application programming interface to enable third party entities to perform system management.

14. The system of claim 9, the processor further causes the system to perform: replacing part or all of a live user interface with the one or more user experience tests and collecting live user interactions.

15. The system of claim 9, the processor further causes the system to perform: parsing historical user interaction data from one or more of an application, a network, a device, or an operating system; and combining the historical user interaction data with the user experience tests to generate simulated test results.

16. The system of claim 9, wherein the step of composing one or more customized user experiences utilizes a methodology selected from one of human interaction, iterative testing algorithm, adaptive learning algorithm, or rule based methods.

* * * * *